Apr. 3, 1923.
T. D. FRAZIER
1,450,800
PNEUMATIC TIRE
Filed Aug. 31, 1922
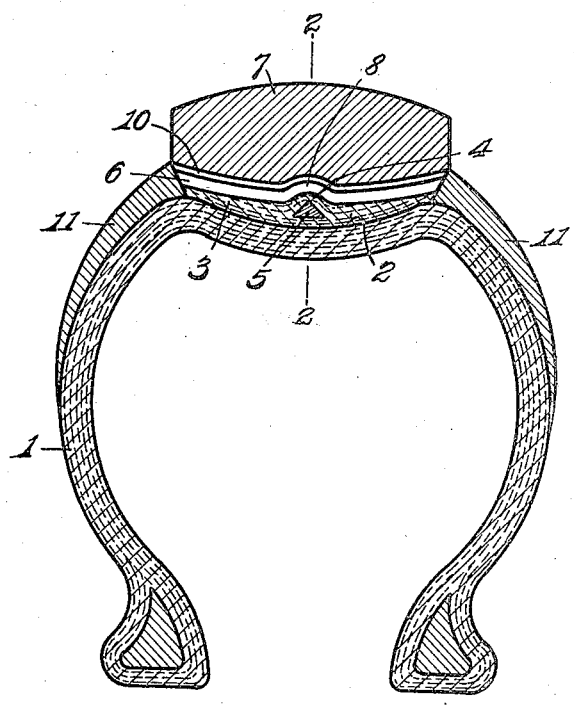
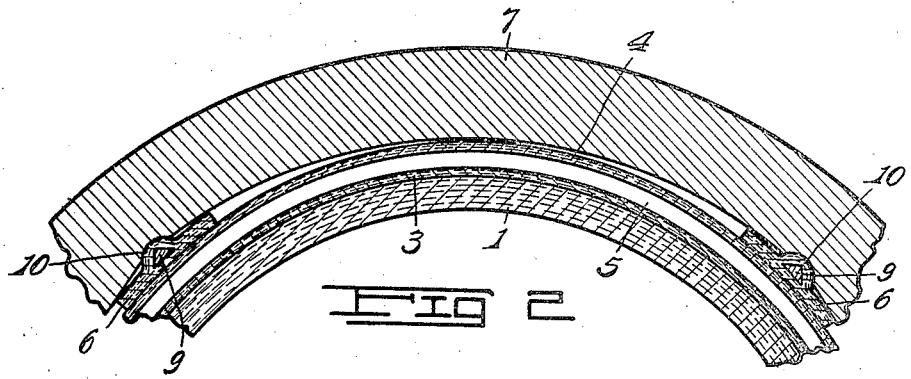
Inventor
Truman D. Frazier.
By H. E. Dunlap.
Attorney Patented Apr. 3, 1923.

1,450,800

UNITED STATES PATENT OFFICE.

TRUMAN D. FRAZIER, OF MARTINS FERRY, OHIO.

PNEUMATIC TIRE.

Application filed August 31, 1922. Serial No. 585,344.

*To all whom it may concern:*

Be it known that I, TRUMAN D. FRAZIER, a citizen of the United States of America, and resident of Martins Ferry, county of Belmont, and State of Ohio, have invented certain new and useful Improvements in Pneumatic Tires, of which the following is a specification.

This invention relates to pneumatic tires, and it has for its primary object to provide a tire embodying a separable tread member which is adapted to be readily detached when worn out and replaced by a new tread member of similar form and size.

A further object is to provide a tire having a removable tread which is securely held in place by the outwardly directed pressure of air imposed upon the embraced casing when the latter is inflated, and which, due to the fact that it does not require vulcanizing on the casing, may be detached and replaced when occasion requires by persons wholly unskilled in tire repair.

With these and other objects in view, the invention resides in the features of construction, arrangement of parts and combinations of elements which will hereinafter be fully described, reference being had to the accompanying drawings, in which—

Figure 1 is a cross section of a tire constructed in accordance with my invention; and—

Figure 2 is a fragmentary section of the tread portion taken on line 2—2, Fig. 1.

Referring to said drawings, 1 indicates a casing carcass composed of a plurality of superposed layers of rubberized fabric or cord, as ordinarily. Said carcass has its tread-carrying portion bowed inward, forming circumferentially thereof a shallow channel 2 of arcuately curved cross sectional configuration. Fitted snugly within said channel is a band 3 formed of a plurality of built-up layers of rubberized fabric, the under surface thereof conforming to said channel and the outer surface thereof being substantially flat in cross sectional configuration, except that one or more upstanding circumferential ribs 4 are provided therein, one such rib disposed in the median line of the band being herein shown. Said rib is preferably formed by embedding between the layers of the band a ring 5 of a suitable inelastic material, as hard rubber, having a suitable cross sectional shape, as conical. Manifestly, the band 3 serves not only to reinforce the tread portion of the carcass 1, but also to maintain the described cross sectional configuration of the carcass when the tire is inflated.

Located at suitable intervals throughout the circumference of the tire are members 6 designed as keys or anchors whereby a tread member 7 disposed in annular relation to said band 3 is maintained against creeping movement with respect to said band. Said anchor members 6, which are disposed transversely of the band 3, are constituted by narrow strips of built-up layers of rubberized fabric having lengths corresponding substantially to the width of said band. Each of said anchors is shaped to conform to the outer face of the band upon which it rests, there being consequently formed in its under side one or more cross channels for fitting upon the rib or ribs 4 of said band and one or more cross ribs 8 on the outer side opposite said channels. Moreover, each of said anchors preferably embodies an embedded longitudinally extending strip 9 of suitable stiff material, preferably of conical form in cross section, whereby an upstanding rib 10 is formed in the outer face of the anchor.

The opposite ends of the anchors 6, which are permanently fixed in place by vulcanizing, abut and are vulcanized to the adjacent circumferentially disposed edges of protective sheaths 11 of rubber carried by the side walls of the carcass 1, said sheaths being terminated abruptly adjacent to the sides of said channel and presenting heavy edges which confront across said channel.

The tread member 7 is made of a suitable vulcanized rubber composition and is designed to be slipped into proper position upon the casing when the latter is deflated and to be held in said position by the expanding force exerted through inflation of the casing. Said tread member is of course molded with an internal diameter having a definite predetermined relation to the size of the casing to which it is to be applied. When the casing has been inflated following fitting of the tread member thereon, the latter is so closely gripped interiorly by the circumferentially spaced anchor members 6, and especially by the ribs 10 of the latter, that annular creeping movement of said member with respect to the casing is positively prevented. Likewise, said tread member is so closely engaged by the cross ribs 8 of said anchors and by the ribs 4 of the band 3 between adjacent anchors that lateral shifting thereof is prevented. Tendency of said tread member to shift laterally on the casing is further resisted by the rubber sheaths 11 between the confronting edges of which said member seats between adjacent anchors.

It will be manifest that the tire constructed in accordance with my invention as herein described possesses various marked advantages over tires in which the tread constitutes an integral and not readily separable part.

It is to be understood that I contemplate various changes and modifications in the formation and arrangement of some of the parts and that, therefore, I desire to be confined only to such limitations as are fairly imposed by the terms of the appended claims.

What is claimed is—

1. A pneumatic tire comprising a carcass having its tread portion bowed inward to form an external circumferential seating channel, a flexible band conformably fitted in said channel and permanently preserving the inwardly bowed configuration of said carcass, protective sheaths of rubber carried by said carcass at opposite sides of said channel, and a readily separable tread member embracing said band between said sheaths.

2. A pneumatic tire comprising a carcass having its tread portion bowed inward to form an external circumferential seating channel, a flexible band conformably fitted in said channel and permanently preserving the inwardly bowed configuration of said carcass, protective sheaths of rubber carried by said carcass at opposite sides of said channel, said sheaths presenting heavy confronting edges, and a readily separable tread member received between said edges of the sheaths in closely embracing relation to said band.

3. A pneumatic tire comprising a carcass having its tread portion bowed inward to form an external circumferential seating channel, a flexible band conformably fitted in said channel and permanently preserving the inwardly bowed configuration of said carcass, said band having thereon an external annular rib, a tread member embracing said band, and means maintaining said tread against displacement with respect to said band when said carcass is inflated.

4. A pneumatic tire comprising a carcass having its tread portion bowed inward to form an external circumferential seating channel, a flexible band conformably fitted in said channel and permanently preserving the inwardly bowed configuration of said carcass, anchor members arranged in circumferentially spaced relation on said band, and a tread member fitted upon said band and gripped internally by said anchor members.

5. A pneumatic tire comprising a carcass having its tread portion bowed inward to form an external circumferential seating channel, a flexible band conformably fitted in said channel and permanently preserving the inwardly bowed configuration of said carcass, protective sheaths of rubber carried by said carcass at opposite sides of and terminating abruptly adjacent to said channel, anchor members disposed transversely on said band in circumferentially spaced relation and having their ends abutting the edges of said sheaths, and a tread member embracing said band and gripped internally by said anchor members.

6. A pneumatic tire comprising a carcass having its tread portion bowed inward to form an external circumferential seating channel, a flexible externally ribbed band conformably fitted in said channel, protective sheaths of rubber carried by said carcass at opposite sides of said channel and presenting heavy edges which confront across said channel, a tread member embracing said band and abutted by said edges of the sheaths, and anchoring means for said tread member.

In testimony whereof, I affix my signature in presence of two subscribing witnesses.

TRUMAN D. FRAZIER.

Witnesses:
    G. O. SMITH,
    H. E. DUNLAP.